United States Patent
Watabe et al.

(10) Patent No.: US 7,940,799 B2
(45) Date of Patent: May 10, 2011

(54) CODE CONVERSION METHOD AND DEVICE THEREOF

(75) Inventors: Akihiro Watabe, Nara (JP); Noboru Mizuguchi, Osaka (JP); Eiji Miyagoshi, Osaka (JP); Takayuki Morishige, Kyoto (JP)

(73) Assignee: Panasonic Corporation, Osaka (JP)

( * ) Notice: Subject to any disclaimer, the term of this patent is extended or adjusted under 35 U.S.C. 154(b) by 583 days.

(21) Appl. No.: 10/541,221

(22) PCT Filed: Feb. 2, 2004

(86) PCT No.: PCT/JP2004/001015
§ 371 (c)(1),
(2), (4) Date: Jul. 1, 2005

(87) PCT Pub. No.: WO2004/071085
PCT Pub. Date: Aug. 19, 2004

(65) Prior Publication Data
US 2006/0153290 A1    Jul. 13, 2006

(30) Foreign Application Priority Data
Feb. 4, 2003   (JP) .................................. 2003-026692

(51) Int. Cl.
*H04J 3/24* (2006.01)
(52) U.S. Cl. ...................................... 370/473; 375/240
(58) Field of Classification Search ............. 375/E7.211, 375/E7.026, E7.001, 240; 704/200, 200.1; 382/232, 236, 238; 341/50, 51; 358/136; 348/407
See application file for complete search history.

(56) References Cited

U.S. PATENT DOCUMENTS

| | | | | |
|---|---|---|---|---|
| 5,241,383 A | * | 8/1993 | Chen et al. | 375/240.04 |
| 5,576,765 A | * | 11/1996 | Cheney et al. | 375/240.02 |
| 5,907,363 A | * | 5/1999 | Botsford et al. | 375/240.05 |
| 5,926,573 A | * | 7/1999 | Kim et al. | 382/239 |
| 5,990,955 A | * | 11/1999 | Koz | 375/240.01 |
| 6,075,900 A | * | 6/2000 | Sakazawa et al. | 382/250 |
| 6,101,195 A | * | 8/2000 | Lyons et al. | 370/498 |
| 6,137,946 A | * | 10/2000 | Ando | 386/52 |

(Continued)

FOREIGN PATENT DOCUMENTS

EP    1599043 A1 * 11/2005
(Continued)

OTHER PUBLICATIONS

Japanese Notice of Reasons for Rejection, w/ English translation thereof, issued in Japanese Patent Application No. JP 2005-504818 dated Mar. 2, 2010.

*Primary Examiner* — Kwang B Yao
*Assistant Examiner* — Syed M Bokhari
(74) *Attorney, Agent, or Firm* — McDermott Will & Emery LLP (57) ABSTRACT

In order to cope with format conversion of user data, the bit rate value and VBV (Video Buffering Verifier) buffer size value in a sequence header of an input code and the VBV delay value in a picture header of the input code are modified to obtain an intermediate code (305 to 309), and additional information (300) is generated for distinguishing GOP (Group of Pictures) user data (307) from the other main data. A VBV buffer simulation is performed using this additional information (300) to multiplex the GOP user data in a picture user data region to a data amount such that the operation does not fail, whereby an output code is generated.

11 Claims, 5 Drawing Sheets

U.S. PATENT DOCUMENTS

| | | | |
|---|---|---|---|
| 6,219,043 B1 * | 4/2001 | Yogeshwar et al. | 341/55 |
| 6,233,226 B1 * | 5/2001 | Gringeri et al. | 370/252 |
| 6,529,550 B2 * | 3/2003 | Tahara et al. | 375/240 |
| 6,647,061 B1 * | 11/2003 | Panusopone et al. | 375/240.12 |
| 6,654,544 B1 * | 11/2003 | Suzuki et al. | 386/112 |
| 6,658,157 B1 * | 12/2003 | Satoh et al. | 382/239 |
| 6,671,323 B1 * | 12/2003 | Tahara et al. | 375/240.26 |
| 6,999,512 B2 * | 2/2006 | Yoo et al. | 375/240.03 |
| 7,170,938 B1 * | 1/2007 | Cote et al. | 375/240.03 |
| 2001/0031002 A1 * | 10/2001 | Hashimoto et al. | 375/240.03 |
| 2002/0054636 A1 * | 5/2002 | Yoneyama | 375/240.01 |
| 2002/0067768 A1 * | 6/2002 | Hurst | 375/240.03 |
| 2002/0080875 A1 * | 6/2002 | Tahara et al. | 375/240.02 |
| 2002/0110193 A1 * | 8/2002 | Yoo et al. | 375/240.02 |
| 2002/0157112 A1 * | 10/2002 | Kuhn | 725/113 |
| 2004/0013195 A1 * | 1/2004 | Panusopone et al. | 375/240.2 |
| 2004/0125876 A1 * | 7/2004 | Kodama et al. | 375/240.16 |
| 2004/0252758 A1 * | 12/2004 | Katsavounidis et al. | 375/240.2 |
| 2005/0058197 A1 * | 3/2005 | Lu et al. | 375/240.03 |
| 2005/0276580 A1 * | 12/2005 | Zacek | 386/131 |
| 2006/0153290 A1 * | 7/2006 | Watabe et al. | 375/240.01 |

FOREIGN PATENT DOCUMENTS

| | | |
|---|---|---|
| JP | 07-184198 | 7/1995 |
| JP | 08-265161 | 10/1996 |
| JP | 10-285529 | 10/1998 |
| JP | 01-220655 | 8/1999 |
| JP | 11-220655 | 8/1999 |
| JP | 2000-228772 | 8/2000 |
| JP | 2001-145067 | 5/2001 |
| JP | 2001-251616 | 9/2001 |
| JP | 2002-218400 | 8/2002 |
| JP | 2002-218458 | 8/2002 |
| WO | WO 2004071085 A1 * | 8/2004 |

* cited by examiner

CODE CONVERSION METHOD AND DEVICE THEREOF

TECHNICAL FIELD

The present invention relates to a code conversion method or a code translation method for compressed/encoded multimedia information and a device thereof. Specifically, the present invention relates to format conversion and addition of user data.

BACKGROUND ART

ISO 13818-2 has been known as one of the standards relating to compression/encoding techniques for multimedia information which are generally called as MPEG-2 (Moving Picture Experts Group Phase 2). A video stream of MPEG-2 has a hierarchical structure which includes a sequence layer, a GOP (Group of Pictures) layer, a picture layer, a slice layer, a macroblock layer, and a block layer in this order from the uppermost layer. Each layer has a special pattern of 4-byte length called a start code at the leading end thereof. This start code starts with three bytes of 0x00, 0x00, and 0x01, and the following one byte indicates the type of data subsequent to the start code. In this specification, "0x" means hexadecimal representation. For example, the fourth bytes of the start codes of the sequence layer, the GOP layer, the picture layer, and the slice layer are 0xB3, 0xB8, 0x00, and 0xAF, respectively.

In MPEG-2, setting of a user extension area is allowed in each of the sequence layer, the GOP layer, and the picture layer. Although it is prescribed that the start code of user data is formed by four bytes of 0x00, 0x00, 0x01, and 0xB2, user data of an arbitrary format determined based on unique user extension can be placed in any user extension area.

Actually, in each of digital storage media, such as a DVD (Digital Versatile Disk), and the like, and digital broadcasting, such as DVB (Digital Video Broadcasting), and the like, unique user extension is realized in compliance with MPEG-2. That fact is that, for example, the standards of user data for closed caption are not unified, and format conversion between user data is necessary.

A realtime encoding technique for storing text information, such as English subtitle information, or the like, in a GOP header as user data has been known (see Japanese Laid-Open Patent Publication No. 2001-145067).

A bit rate converter (transcoder) with which the process amount in conversion between TSs (Transport Streams) can be reduced has been proposed (see Japanese Laid-Open Patent Publication No. 2001-251616).

As a matter of course, the simplest method for converting the format of user data is to connect a decoder of a system and an encoder of another system. However, unnecessary processes are performed on data other than the user data, i.e., main data, and can be a cause of deterioration in image quality.

Nevertheless, if only the format of user data included in an input code is simply converted to obtain an output code, the data amount greatly changes because of the conversion. Accordingly, there is a possibility that rate control fails. As parameters for determining the allowable range of data amount, a bit rate value and a VBV (Video Buffering Verifier) buffer size value are included in a sequence header, and a VBV delay value is included in a picture header. There is a possibility that rate control based on these parameters fails.

The same applies to a case where user data is added to an input code to generate an output code.

DISCLOSURE OF INVENTION

An objective of the present invention is to provide a code translation method, and a device thereof, with which format conversion or addition of user data is realized without failure of rate control.

In order to achieve this objective, according to the present invention, an input code stored in a hierarchical data structure is converted to generate an output code. The input code includes (1) a parameter related to the amount of data encoded by the input code, (2) user data at a first level of the hierarchical data structure, (3) and main data at a second level of the hierarchical data structure. The output code, stored in the hierarchical data structure, is generated by modifying the input code by moving the user data to a third level of the hierarchical data structure, and changing the parameter to reflect the change in code size effected by the moving of the user data. Further, the main data included in the output code is identical to the main data included in the input code.

BRIEF DESCRIPTION OF DRAWINGS

FIG. 2 illustrates the format of an input code. FIG. 3 illustrates the format of an intermediate code. FIG. 2 illustrates the format of an output code.

BEST MODE FOR CARRYING OUT THE INVENTION

Hereinafter, an embodiment of the present invention which is directed to code translation is described in detail with reference to the drawings. It should be noted that a problem is simplified. It is assumed that, in the first place, an input code is a video stream of MPEG-2 and is translated to an output code of a predetermined format. The input code has a user extension area of GOP layer (GOP user data area), and the output code has user extension areas of picture layer (picture user data areas). For example, user data for closed caption is placed in each of these areas. It is further assumed that one GOP includes 15 frames at the maximum, and only user data corresponding to some leading frames are included in one GOP. That is, it is assumed that one GOP does not necessarily include all of user data corresponding to every picture. Before translation, only one out of 15 frames is provided with a 4-byte start code. After translation, every frame is provided with a 4-byte start code of user data. Thus, even when only the start codes are considered on the assumption that there are 30 frames per second, the bit rate is increased by translation by (14/15)×30×4×8 bps. It is further assumed that the position of user data after translation is not strictly determined. For example, user data for closed caption is not required to have a perfect synchronization with picture data.

The above-described assumption about the user data position and a condition where there are not necessarily user data corresponding to all of the frames are appropriate assumptions in existing systems for closed caption, and the like.

Figure 1:
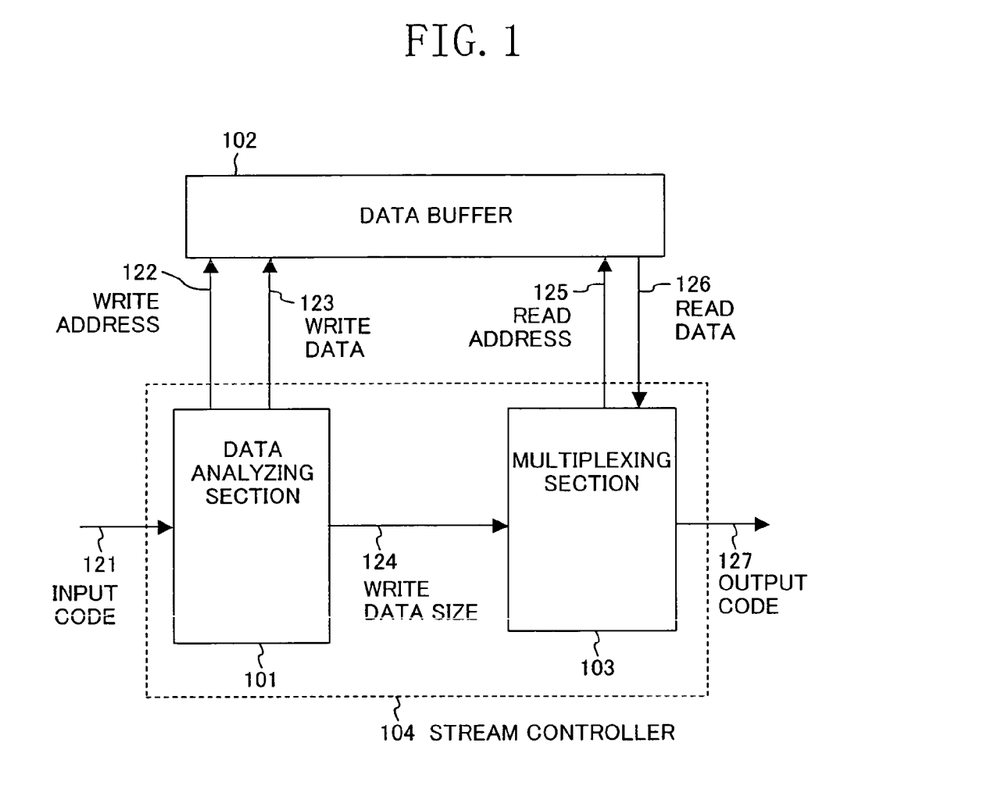
FIG. 1 is a block diagram showing an example of a structure of a code translation device according to the present invention.

FIG. 1 shows an example of a structure of a code translation device according to the present invention. The code translation device of FIG. 1 includes a data analyzing section 101, a data buffer 102, and a multiplexing section 103. For example, the data analyzing section 101 and the multiplexing section 103 constitute a single LSI called a stream controller 104. An external memory which functions as the data buffer 102 is connected to the LSI. The data analyzing section 101 has a function of analyzing an input code 121 to change parameters which determine the allowable range of data amount in the input code 121 (bit rate value, VBV buffer size value, and VBV delay value) so as to comply with the format conversion of user data, and generate additional information which is used for distinguishing the user data included in the input code 121 from the other main data. The data buffer 102 is a memory for temporarily storing an input code which has changed parameters together with the additional information. Reference numeral 122 denotes a write address which is supplied from the data analyzing section 101 to the data buffer 102. Reference numeral 123 denotes write data which is supplied from the data analyzing section 101 to the data buffer 102. Reference numeral 124 denotes the write data size about which the multiplexing section 103 is notified by the data analyzing section 101. The multiplexing section 103 has a function of multiplexing an input code which has changed parameters and user data in a predetermined format according to the additional information stored in the data buffer 102 to generate an output code 127 according to the changed parameters. Reference numeral 125 denotes a read address which is supplied from the multiplexing section 103 to the data buffer 102. Reference numeral 126 denotes read data which is supplied from the data buffer 102 to the multiplexing section 103.

Figure 2:
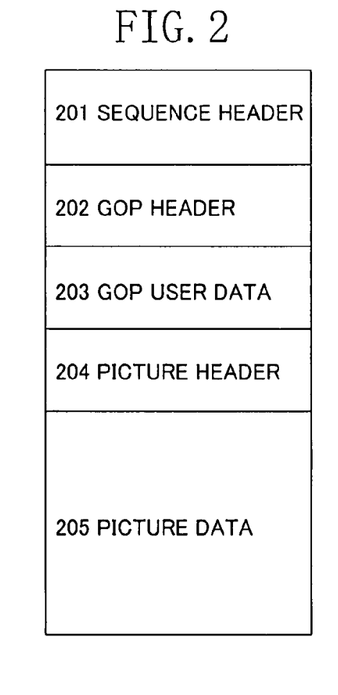
FIG. 2, FIG. 3 and FIG. 4 are data format diagrams of data used in the code translation device of FIG. 1.
Figure 3:
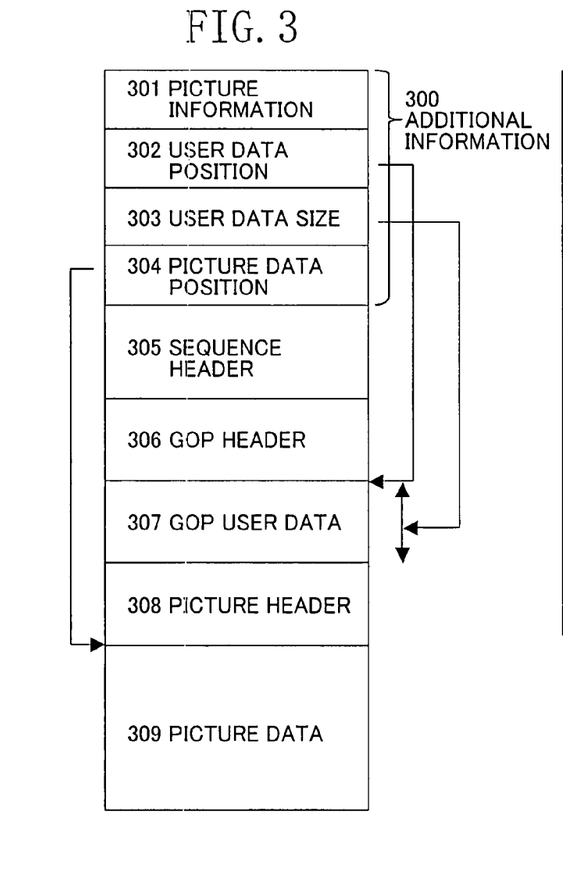
Figure 4:
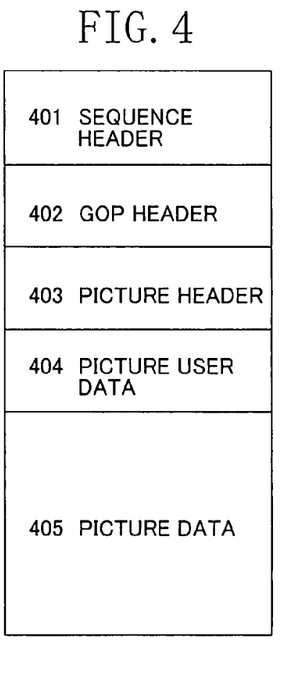

FIG. 2 is a data format diagram showing the input code 121. FIG. 3 is a data format diagram showing an intermediate code stored in the data buffer 102. FIG. 4 is a data format diagram showing the output code 127.

In FIG. 2, reference numeral 201 denotes a sequence header, reference numeral 202 denotes a GOP header, reference numeral 203 denotes GOP user data, reference numeral 204 denotes a picture header, and reference numeral 205 denotes picture data. The region of the GOP user data 203 includes user data for closed caption. FIG. 2 shows only one picture but, in actuality, the unit of "picture header 204+picture data 205" is repeated a number of times which corresponds to the number of pictures.

In the intermediate code shown in FIG. 3, reference numeral 305 denotes a sequence header, reference numeral 306 denotes a GOP header, reference numeral 307 denotes GOP user data, reference numeral 308 denotes a picture header, and reference numeral 309 denotes picture data. These respectively correspond to the sequence header 201, the GOP header 202, the GOP user data 203, the picture header 204, and the picture data 205 shown in FIG. 2. This intermediate code further includes additional information 300 for distinguishing the GOP user data 307 from the main data, such as the picture data 309, and the like. In the additional information 300, reference numeral 301 denotes picture information which includes the picture size and picture type, reference numeral 302 denotes a user data position, reference numeral 303 denotes a user data size, and reference numeral 304 denotes a picture data position. In the picture information 301, the picture size represents the entire size of a picture included in one processing unit, and the picture type represents the coding type of I (Intra) picture, P (Predictive) picture, or B (Bidirectionally predictive) picture. The leading position and size of the GOP user data 307 are represented by the user data position 302 and the user data size 303, respectively. The leading position of the picture data 309 is represented by the picture data position 304.

The data analyzing section 101 stores data having the additional information 300 shown in FIG. 3 in the data buffer 102. Since a start code, which is a special pattern of 4-byte length, is always inserted between data, such a data structure can be readily created in the case of a randomly-accessible memory. Further, by providing the additional information 300, a data buffer access with the GOP user data 307 being distinguished from the other data is readily realized. Furthermore, since there is the picture information 301 which includes the picture size, the end of the data structure of FIG. 3, i.e., the starting point of the subsequent additional information 300, can readily be accessed.

The bit rate value and VBV buffer size value define the upper limit of the data amount. The VBV delay value defines the lower limit of the data amount in the case of CBR (Constant Bit Rate). However, when the VBV delay value is 0xffff, it is regarded as VBR (Variable Bit Rate), and the restriction on the lower limit of the data amount is removed.

The bit rate value and VBV buffer size value included in the sequence header 305 and the VBV delay value included in the picture header 308 are already rewritten by the data analyzing section 101 so as to comply with format conversion of user data. For example, the bit rate value is increased by (14/15)×30×4×8 bps, which is an estimated value of a bit rate increase by format conversion of user data. The VBV buffer size value is changed to the maximum value which is allowed by the standards. The VBV delay value is set to 0xffff, whereby the setting of VBR is provided. If the user data is reduced by format conversion, the rewritten bit rate value may be smaller than the original bit rate value. The rewritten VBV buffer size value only needs to be greater than an estimated maximum picture size. Alternatively, the original VBV buffer size value may be used as it is. A method can also be used wherein the setting of VBR is abandoned and the VBV delay value is recalculated still at CBR to perform stuffing. Alternatively, these parameter changes may be performed in the multiplexing section 103.

The multiplexing section 103 multiplexes the GOP user data 307 with the other main data according to the additional information 300 included in the data buffer 102 to generate an output code 127 which has the format shown in FIG. 4.

In FIG. 4, reference numeral 401 denotes a sequence header, reference numeral 402 denotes a GOP header, reference numeral 403 denotes a picture header, reference numeral 404 denotes picture user data, and reference numeral 405 denotes picture data. These respectively correspond to the sequence header 305, the GOP header 306, the picture header 308, the GOP user data 307, and the picture data 309 shown in FIG. 3. FIG. 4 shows only one picture but, in actuality, the unit of "picture header 403+picture user data 404+picture data 405" is repeated a number of times which corresponds to the number of pictures.

Hereinafter, details of the data analyzing section 101 and the multiplexing section 103 are described with reference to FIGS. 5 and 6.

Figure 5:
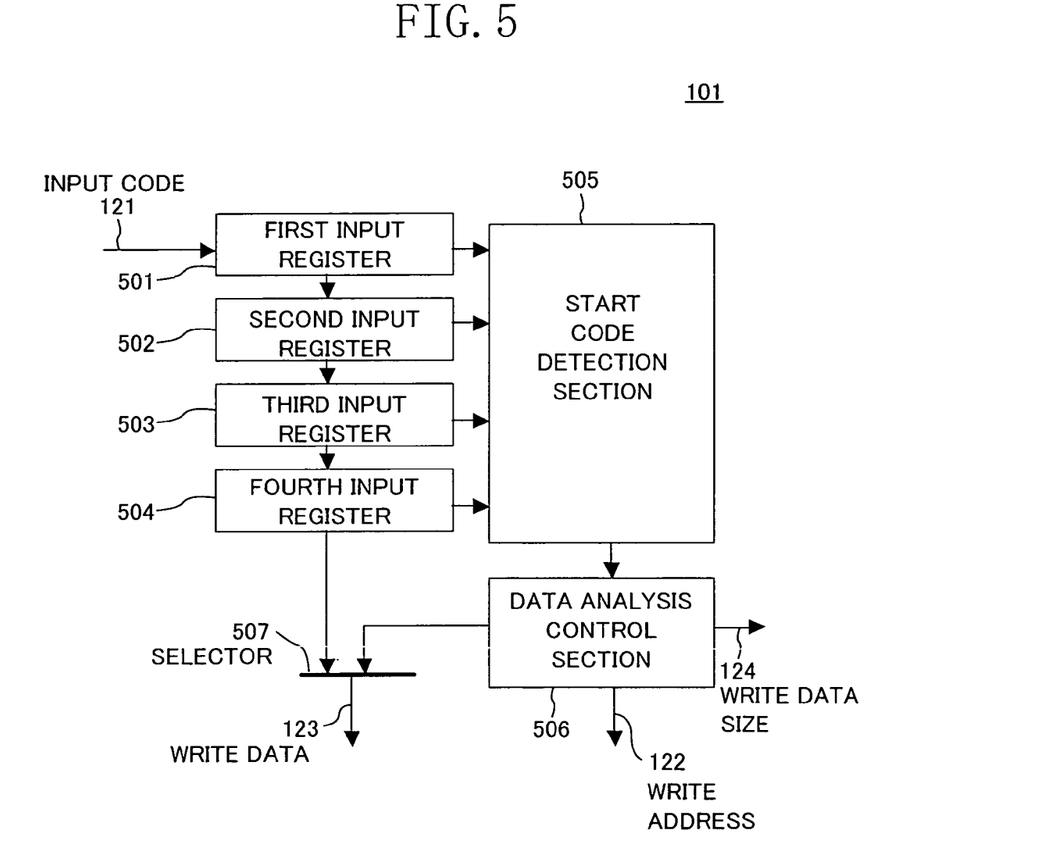
FIG. 5 is a block diagram showing an example of an internal structure of a data analyzing section shown in FIG. 1.

FIG. 5 shows an example of an internal structure of the data analyzing section 101 shown in FIG. 1. The data analyzing section 101 of FIG. 5 includes first, second, third and fourth input registers 501, 502, 503 and 504, a start code detection section 505, a data analysis control section 506 for controlling the entire operation of the data analyzing section 101, and a selector 507 which is used for insertion of the additional information 300.

The data analyzing section 101 repeats the following steps 1 to 7 for every single byte. Specifically, data is taken in at step 1. At step 2, it is determined whether or not the data and the previously-input 3-byte data constitute a start code. If a predetermined condition is satisfied at step 2, the process of writing additional information is performed at step 3. After this process, a pointer for data writing is increased by a predetermined size as a preparation for writing of additional information for the next picture. At step 4, flags are set based on the start code. At step 5, the bit rate value, the VBV buffer size value, and the VBV delay value are changed. At step 6, counters are incremented. At step 7, multiplexed data is written in the data buffer 102.

Hereinafter, the flags and counters of the data analysis control section 506 are described before the details of the steps are described. PICSIZE is a counter indicating the size of a picture which is one unit for processing and is used for rate control and detection of the next additional information position. USER_COUNT is a counter which indicates the start position of user data. USERSIZE is a counter which indicates the size of the user data. PICDATA_COUNT is a counter which indicates the start position of picture data. These four counters respectively correspond to the picture size included in the picture information 301, the user data position 302, the user data size 303, and the picture data position 304 shown in FIG. 3. SEQHEAD_FLAG, GOPHEAD_FLAG, PICHEAD_FLAG, USER_FLAG and SLICE_FLAG are flags which respectively indicate that the start codes of the sequence header, the GOP header, the picture header, the user data, and the slice have been detected. PICTOP_COUNT is a counter which indicates the number of bytes in the picture header and is used for changing the VBV delay value. BP and WP are pointers of the data buffer 102. BP is the first pointer which indicates the write position of the additional information 300. WP is the second pointer which indicates the write position of other data.

<Step 1: Taking in Input Data>

The value of the third input register 503 is written in the fourth input register 504. Thereafter, values are sequentially written, and 1-byte data of the input code 121 is written in the first input register 501.

<Step 2: Detecting Start Code>

The start code detection section 505 determines whether 4-byte data of the first to fourth input registers 501 to 504 is identical to any of the start codes or all the bytes are 0x00.

<Step 3: Writing Additional Information>

The entire process of step 3 is performed as described below only under any of the following conditions: (a) a sequence header is detected; (b) SEQHEAD_FLAG=0 and a GOP header is detected; and (c) SEQHEAD_FLAG=0, GOPHEAD_FLAG=0, and a picture header is detected.

The first operation at step 3 is a process of writing the additional information 300 in a predetermined format in the data buffer 102. Herein, the values of PICSIZE, USER_COUNT, USERSIZE, and PICDATA_COUNT are written in address locations designated by first pointer BP.

Then, the first and second pointers BP and WP are updated. Specifically, the value of second pointer WP is assigned to first pointer BP, and the value of second pointer WP is increased by the size of the additional information 300. Through this operation, the position of the additional information of the next picture is written in first pointer BP, and the next position of the additional information is written in second pointer WP.

Lastly, the flags and counters are initialized. Specifically, PICSIZE, USER_COUNT, USERSIZE, PICDATA_COUNT and PICTOP_COUNT are all initialized to 0, and SEQHEAD_FLAG, GOPHEAD_FLAG, PICHEAD_FLAG and USER_FLAG are all cleared to 0.

<Step 4: Flag Update Process>

According to a result of the start code detection, corresponding flags are cleared and set. Specifically, (1) when a sequence header is detected, flags are set such that SEQHEAD_FLAG=1, GOPHEAD_FLAG=0, PICHEAD_FLAG=0, and USER_FLAG=0. (2) When a GOP header is detected, flags are set such that GOPHEAD_FLAG=1, PICHEAD_FLAG=0 USER_FLAG=0. (3) When a picture header is detected, flags are set such that PICHEAD_FLAG=1 and USER_FLAG=0. (4) When a start code of user data is detected, the content of GOPHEAD_FLAG is set in USER_FLAG. (5) When a start code of a slice is detected, flags are set such that SEQHEAD_FLAG=0, GOPHEAD_FLAG=0, PICHEAD_FLAG=0, USER_FLAG=0, and SLICE_FLAG=1.

<Step 5: Data Rewrite Process>

The bit rate value, the VBV buffer size value, and the VBV delay value are changed as described above. When SEQHEAD_FLAG=1, PICSIZE indicates the number of bytes counted from the sequence header. The bit rate value and the VBV buffer size value can be determined based on the value of PICSIZE. Further, 2 bytes of the VBV delay value are determined using PICTOP_COUNT and rewritten.

<Step 6: Incrementing Counter>

It is assumed that step 6 and step 7 are skipped when the values of the first to fourth input registers 501 to 504 are all 0x00. That is, step 7 of data writing is skipped, and as a result, stuffed zeros (redundant data included in the main data) are deleted. According to the standards, deletion of such a pattern does not cause any adverse effect.

If any of the first to fourth input registers 501 to 504 has a value other than 0x00, the data analysis control section 506 operates as described below. Specifically, PICSIZE is incremented irrespective of the flags. USER_COUNT is incremented only when USER_FLAG=0 and PICHEAD_FLAG=0. USERSIZE is incremented only when USER_FLAG=1. PICDATA_COUNT is incremented only when SLICE_FLAG=0. PICTOP_COUNT is incremented only when PICHEAD_FLAG=1. With these conditions, the counters can count a predetermined size according to occurrence of respective start codes.

<Step 7: Writing Data>

If any of the first to fourth input registers 501 to 504 has a value other than 0x00, the value of the fourth input register 504 is written in an address position in the data buffer 102 which is indicated by second pointer WP, and second pointer WP is increased by 1.

It should be noted that, as the write data size 124, the value of first pointer BP of the data analysis control section 506 is output as it is. That is, the write data size 124 indicates an address in which the additional information 300 is last written.

The format shown in FIG. 3 is realized by writing data in the data buffer 102 according to the flow as described above. The most important point here is that the data buffer 102 is accessible in such a manner that the region of the GOP user data 307 is distinguished from the region of the other main data. Another method may be employed so long as such distinguishment is achieved. For example, a buffer may be provided as a separate region. However, the user efficiency of a buffer is improved when data is distinguished in such a manner that the additional information 300 is added onto a single buffer, rather than when a separate buffer is prepared. Other information, such as the original data size, or the like, may be further added to the additional information 300.

Figure 6:
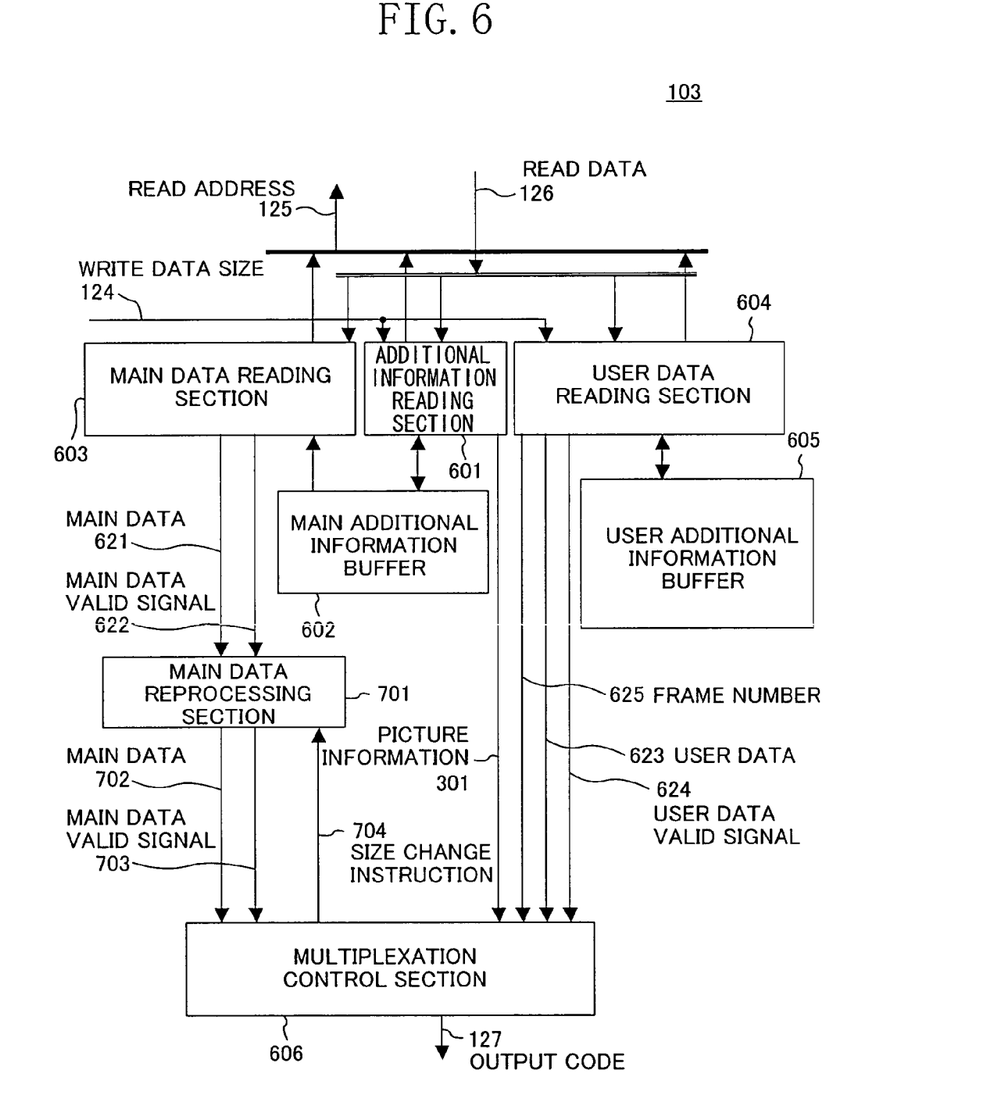
FIG. 6 is a block diagram showing an example of an internal structure of a multiplexing section shown in FIG. 1.

FIG. 6 shows an example of an internal structure of the multiplexing section 103 shown in FIG. 1. The multiplexing section 103 of FIG. 6 includes an additional information reading section 601 for sequentially outputting additional information, a main additional information buffer 602 for holding the additional information, a main data reading section 603 for sequentially outputting main data, a user data reading section 604 for sequentially outputting user data, a user additional information buffer 605 for holding additional information which is referred to by the user data reading section 604, a multiplexation control section 606, and a main data reprocessing section 701. The main additional information buffer 602 is used in multiplexation of main data such that additional information is deleted every time one picture is multiplexed. On the other hand, the user additional information buffer 605 is used in multiplexation of user data such that additional information is deleted only when the user data is successfully multiplexed. Reference numerals 621 and 702 denote main data. Reference numerals 622 and 703 denote main data valid signals. Reference numeral 623 denotes user data. Reference numeral 624 denotes a user data valid signal. Reference numeral 625 denotes a frame number. Reference numeral 704 denotes a size change instruction. The multiplexation control section 606 outputs the main data 702, the user data 623, start codes, etc., at appropriate timings, thereby outputting an output code 127 which has the format shown in FIG. 4. The write data size 124 indicates up to where the data analyzing section 101 has written data, thereby preventing the multiplexing section 103 from erroneously processing unwritten data. The functions of the main data reprocessing section 701 will be described later.

A general operation of the multiplexation control section 606 is now described. In the first place, the amount of user data which can be placed in each picture layer is calculated based on the data of the main additional information buffer 602. Then, the sequence header 305, the GOP header 306 and the picture header 308 shown in FIG. 3 are sequentially output. Thereafter, the GOP user data 307 is multiplexed to the amount of data which can be placed, and then, the picture data 309 is output. As a result, the sequence header 401, the GOP header 402, the picture header 403, the picture user data 404, and the picture data 405 are obtained.

Herein, the data amount after translation is increased by the placement of the picture user data 404, but desired user data can necessarily be placed within a plurality of frames. Since the amount of data which can be placed is calculated in advance, this placement process does not cause the rate control to fail. Since the bit rate value is increased from the original value, data which cannot be placed do not occur in succession.

More detailed descriptions are now provided. The additional information reading section 601 includes a read pointer and a counter for the picture size. The additional information reading section 601 starts operations when the write address 122 is greater than the read pointer and the main additional information buffer 602 has a vacant space. In the first place, the additional information reading section 601 reads the additional information 300 from the data buffer 102 using the read pointer and writes the additional information 300 in the main additional information buffer 602. Then, the position of the next additional information is identified using picture size information obtained from the picture information 301, and the read pointer of the data buffer 102 is increased to the identified position. The main additional information buffer 602 can store plural sets of additional information.

The main data reading section 603 sequentially reads only the main data based on the additional information stored in the main additional information buffer 602 and outputs the read main data to the main data reprocessing section 701. Although details will be described later, the main data reprocessing section 701 generally supplies the given main data 621 as it is to the multiplexation control section 606 as the main data 702. After reading of one picture is completed, corresponding additional information is deleted from the main additional information buffer 602. When effective main data 621 is prepared, the main data reading section 603 sets the main data valid signal 622 to 1 and notifies the multiplexation control section 606 through the main data reprocessing section 701 that the effective main data 621 is prepared. In this case, the main data reprocessing section 701 supplies the given main data valid signal 622 as it is to the multiplexation control section 606 as the main data valid signal 703.

The user data reading section 604 sequentially writes the additional information in the user additional information buffer 605 and sequentially performs only reading of the GOP user data 307 according to the written additional information. In this process, if the size of the user data is 0, the next picture is searched for. When effective user data 623 is prepared, the user data reading section 604 sets the user data valid signal 624 to 1 and outputs a frame number 625 which corresponds to the effective user data 623. The frame number 625 includes information about how many pictures from the leading end a picture including this data is and information about how many words from the leading end the user data which is to be read next is. The frame number 625 indicates information about how many frames the user data which is to be placed should be regarded as belonging to.

The multiplexation control section 606 waits for the main data valid signal 703 to change to 1 every single picture and operates as described below. In the first place, the multiplexation control section 606 determines whether or not user data is to be placed at a current multiplexation subject picture. That is, the multiplexation control section 606 determines an optimum picture at which the user data is to be placed while performing a simulation such that the VBV buffer does not go out of operation.

When the user data valid signal 624 is 0, the user data is not placed.

When the user data valid signal 624 is 1 and the frame number 625 is equal to or smaller than the picture number of main data which is a multiplexation subject, the user data is placed at a currently-processed picture as much as possible. Thus, a buffer simulation is performed on the current picture on the assumption that the user data has been placed. If no failure occurs in the simulation, the user data is actually placed at the current picture. Specifically, the picture size achieved after the user data is placed is calculated from the picture size included in the picture information 301 and the user data size 303 obtained from the main additional information buffer 602, and it is checked whether or not the currently-occupied area of the VBV buffer is greater than the calculated picture size achieved after the placement of the user data, whereby it is determined whether or not a failure occurs in the simulation.

When the user data valid signal 624 is 1 and the frame number 625 is greater than the picture number of main data which is a multiplexation subject, the process is repeated as long as it is possible while changing the position at which the user data is placed on a picture by picture basis (for example, the process is first performed with the user data placed at the current picture, and then, the process is performed again with the user data placed at the next picture) till the process is performed with the user data placed at a frame identified by the frame number 625. These simulations are possible when the additional information corresponding to the frames up to a pertinent frame are stored in the main additional information buffer 602. If additional information of a picture corresponding to the frame number 625 is not stored in the main additional information buffer 602, the user data is not placed.

If through the series of above processes the position where the VBV buffer does not go out of operation is found to be only the current multiplexation subject picture, the user data is placed at the current picture.

Through the above determination of conditions, it is determined whether or not the picture user data 404 is to be placed. If it is determined that the picture user data 404 is to be placed, the picture user data 404 is placed next to the picture header 403 together with a user start code.

It should be noted that, since the leading position of the picture data 309 is indicated by the picture data position 304 included in the additional information 300, multiplexation of the picture data 405 can be achieved extremely readily. Lastly, the value of the VBV buffer occupation amount is calculated based on the multiplexed data amount of the output code 127. This value is used in multiplexation of the next picture.

As described above, the multiplexing section 103 of FIG. 6 operates to multiplex the picture user data 404 at a position indicated by the frame number 625 so long as it is possible. That is, a synchronization difference between main data and user data in the output code 127 is minimized.

The multiplexing section 103 may operate such that, if the frame number 625 is greater than the picture number of main data which is a multiplexation subject, buffer simulation is not performed, and the picture user data 404 is not placed. In this case, the user data is written in a picture which is a subsequent processing unit. This method is realized only with a one-picture area in the main additional information buffer 602 and therefore simplifies the process.

As described above, according to this embodiment, in the case where the data amount is increased in format conversion of only user data, the upper limit of the data amount is raised by, for example, increasing the bit rate value, while the lower limit of the data amount is lowered by switching from CBR to VBR, and user data is inserted into the picture layer to the amount of data which can be placed, whereby code translation is achieved. Since only the user data is subjected to the format conversion, unnecessary processes regarding picture data are removed. As a result, the code translation is achieved more quickly while no deterioration occurs in picture quality.

In the above-described operation, when the synchronization difference between main data and user data in the output code 127 exceeds a predetermined amount, the main data reprocessing section 701 operates to change the data amount of the main data.

Figure 7:
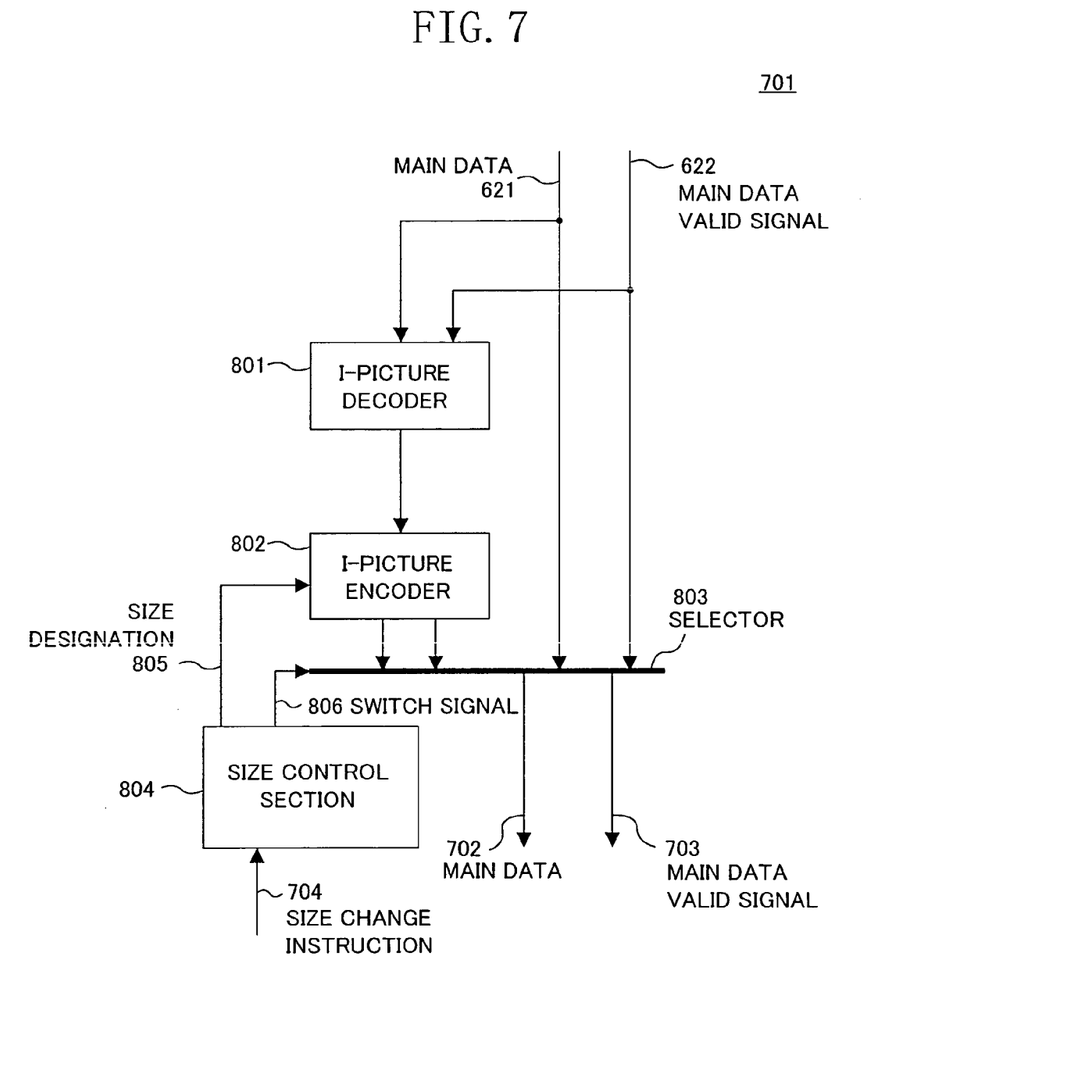
FIG. 7 is a block diagram showing an example of an internal structure of a main data reprocessing section shown in FIG. 6.

FIG. 7 shows an example of an internal structure of the main data reprocessing section 701 shown in FIG. 6. The main data reprocessing section 701 of FIG. 7 includes an I-picture decoder 801, an I-picture encoder 802, a selector 803 and a size control section 804. Only when the main data 621 received from the main data reading section 603 is an I-picture, if the size change instruction 704 indicates that the synchronization difference between main data and user data in the output code 127 exceeds a predetermined amount, the main data reprocessing section 701 decodes the main data 621 and re-encodes a result of the decoding, thereby reducing the data amount of the main data 702. If the size change instruction 704 is not given, the selector 803 selects the main data 621 and the main data valid signal 622 supplied from the main data reading section 603, and the selected main data 621 and main data valid signal 622 are supplied as they are to the multiplexation control section 606 as the main data 702 and main data valid signal 703, respectively.

Herein, especially problematic is that the user data cannot be inserted because of too much data amount of one frame. Such a case occurs frequently in I-pictures, from which other pictures are not referred to, as compared with P-pictures and B-pictures. Thus, the multiplexation control section 606 monitors the picture type included in the picture information 301. Only when it is found by a VBV buffer simulation that insertion of user data in an I-picture causes the buffer to go out of operation, the multiplexation control section 606 gives the size change instruction 704 to the size control section 804.

Receiving the size change instruction 704, the size control section 804 gives a size designation 805 to the I-picture encoder 802. The I-picture encoder 802 re-encodes a result of decoding by the I-picture decoder 801 to generate main data which has a reduced data amount and output a main data valid signal in substitution for the main data valid signal 622. According to a switch signal 806 supplied from the size control section 804, the selector 803 supplies the main data and main data valid signal received from the I-picture encoder 802 to the multiplexation control section 606 as the main data 702 and main data valid signal 703, respectively.

It should be noted that the situation considered herein is not likely to occur frequently. According to this embodiment, re-encoding is performed in the main data reprocessing section 701 only in the above-described special case. Thus, deterioration in process speed is not frequently caused, and the effect of suppressing a synchronization difference is achieved.

It should be noted that the present invention is applicable not only to format conversion of user data but also to addition of user data.

Industrial Applicability

As described above, in a code translation method and code translation device according to the present invention, format conversion and addition of user data are realized without a failure of rate control. Therefore, the code translation method and code translation device are useful in code translation of compressed/encoded multimedia information.

The invention claimed is:

1. A code translation method comprising the steps of:
 receiving an input code stored in a hierarchical data structure, the input code including
  a first value in a parameter of the hierarchical data structure which determines an allowable range of data amount in the input code,
  user data in a first layer of the hierarchical data structure, and
  main data in a second layer of the hierarchical data structure;
 storing the user data and main data in a data buffer; and
 generating an output code stored in the hierarchical data structure, the output code including
  the stored main data,
  the stored user data in a layer of the hierarchical data structure other than the first layer, and
  a second value in the parameter of the hierarchical data structure which determines an allowable range of data amount in the output code, the second value being different from the first value to reflect a change from the allowable range of data amount in the input code effected by moving the user data from the input code to the output code;

wherein the stored main data included in the output code is identical to the main data included in the input code.

2. The code translation method of claim 1, wherein
the hierarchical data structure conforms with the ISO 13818-2 standard;
the parameter of the hierarchical data structure is one of a bit rate value, a VBV (Video Buffering Verifier) buffer size value, and a VBV delay value; and
the main data comprises compressed video data.

3. The code translation method of claim 2, wherein
the first layer of the hierarchical data structure is the Group of Pictures (GOP) layer; and
the third layer of the hierarchical data structure is the picture layer.

4. The code translation method of claim 2, wherein
the first layer of the hierarchical data structure is the picture layer; and
the third layer of the hierarchical data structure is the Group of Pictures (GOP) layer.

5. The code translation method of claim 1, further comprising the step of generating additional information for distinguishing the user data included in the input code from the main data,
wherein generation of the output code is advanced according to the additional information.

6. The code translation method of claim 1, wherein
the stored main data included in the output code is in the second layer of the of the hierarchical data structure.

7. A code translation device comprising:
a data analyzing section adapted to identify in an input code stored in a hierarchical data structure
a first value in a parameter of the hierarchical data structure which determines an allowable range of data amount in the input code,
user data in a first layer of the hierarchical data structure, and
main data in a second layer of the hierarchical data structure; and
a multiplexing section which produces an output code stored in a hierarchical data structure, the output code including
the stored main data,
the user data in a layer of the hierarchical data structure other than the first layer,
a second value in the parameter of the hierarchical data structure which determines an allowable range of data amount in the output code, the second value being different from the first value to reflect a change from the allowable range of data amount in the input code effected by moving the user data from the input code to the output code;
wherein the main data included in the output code is identical to the main data included in the input code.

8. The code translation device of claim 7, wherein
the hierarchical data structure conforms with the ISO 13818-2 standard;
the parameter of the hierarchical data structure is one of a bit rate value, a VBV (Video Buffering Verifier) buffer size value, and a VBV delay value; and
the main data comprises compressed video data.

9. The code translation device of claim 8, wherein
the first layer of the hierarchical data structure is the Group of Pictures (GOP) layer; and
the third layer of the hierarchical data structure is the picture layer.

10. The code translation device claim 8, wherein
the first layer of the hierarchical data structure is the picture layer; and
the third layer of the hierarchical data structure is the Group of Pictures (GOP) layer.

11. The code translation device of claim 8, wherein
the stored main data included in the output code is in the second layer of the of the hierarchical data structure.

* * * * *